United States Patent
Heinisch

(10) Patent No.: US 11,649,055 B2
(45) Date of Patent: May 16, 2023

(54) PROCESS FOR DETERMINING THAT LUGGAGE HAS BEEN LEFT BEHIND IN AN OVERHEAD BIN

(71) Applicant: Airbus Operations GmbH, Hamburg (DE)

(72) Inventor: Matthias Heinisch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 369 days.

(21) Appl. No.: 16/715,743

(22) Filed: Dec. 16, 2019

(65) Prior Publication Data

US 2021/0179267 A1 Jun. 17, 2021

(51) Int. Cl.
*B64D 11/00* (2006.01)
*B64D 9/00* (2006.01)

(52) U.S. Cl.
CPC ............. *B64D 11/003* (2013.01); *B64D 9/00* (2013.01); *B64D 11/0015* (2013.01)

(58) Field of Classification Search
CPC ...... B64D 11/003; B64D 9/00; B64D 11/0015
See application file for complete search history.

(56) References Cited

U.S. PATENT DOCUMENTS

| | | | | |
|---|---|---|---|---|
| 9,911,290 | B1* | 3/2018 | Zalewski | G06Q 30/0633 |
| 10,713,617 | B2* | 7/2020 | Savian | G06Q 10/087 |
| 10,936,879 | B2* | 3/2021 | Ibrahim | H04N 7/181 |
| 11,198,510 | B2* | 12/2021 | Carswell | G06T 7/62 |
| 2013/0211864 | A1* | 8/2013 | Sanderson | B64F 1/366 |
| | | | | 705/5 |
| 2016/0109280 | A1* | 4/2016 | Tiu | G01F 17/00 |
| | | | | 702/173 |
| 2016/0300281 | A1* | 10/2016 | Horstemeyer | B60R 25/102 |
| 2017/0004384 | A1* | 1/2017 | Audo | G06Q 50/28 |
| 2017/0004444 | A1* | 1/2017 | Krasko | G06Q 10/0833 |
| 2017/0188679 | A1* | 7/2017 | Jacob | A45C 13/42 |
| 2017/0283086 | A1* | 10/2017 | Garing | B64D 45/0051 |
| 2017/0289494 | A1* | 10/2017 | Garing | B64D 45/00 |
| 2018/0086464 | A1* | 3/2018 | Riedel | G06K 17/00 |
| 2018/0111698 | A1* | 4/2018 | Podnar | G06Q 10/043 |
| 2018/0173962 | A1* | 6/2018 | Ibrahim | H04N 5/247 |
| 2018/0285635 | A1* | 10/2018 | Arata | G06V 40/28 |

(Continued)

FOREIGN PATENT DOCUMENTS

| | | | |
|---|---|---|---|
| CN | 109071025 A | * 12/2018 | ......... B64D 11/0638 |
| JP | 2001285842 A | * 10/2001 | |
| WO | 2018185108 A1 | 10/2018 | |

OTHER PUBLICATIONS

Velan, Kristina, TAP Begins Flying with Sensor-Equipped Recaro iSeats, Comfort, Nov. 14, 2019, https://apex.aero/2019/11/14/tap-sensor-equipped-recaro/iseats.

*Primary Examiner* — Donald J Wallace
*Assistant Examiner* — Jalal C Coduroglu
(74) *Attorney, Agent, or Firm* — Greer, Burns & Crain, Ltd

(57) ABSTRACT

Processes and systems for determining that a piece of luggage has been left behind in an overhead bin of a vehicle. When a passenger places a piece of luggage into the overhead bin, it is associated with that passenger by detecting that the passenger has sat down in a particular seat after the luggage has been placed into the overhead bin. When it has been determined that the passenger has deboarded the vehicle, and the luggage has not been removed, reminder signals are sent.

18 Claims, 2 Drawing Sheets

(56) References Cited

U.S. PATENT DOCUMENTS

Figure 1:
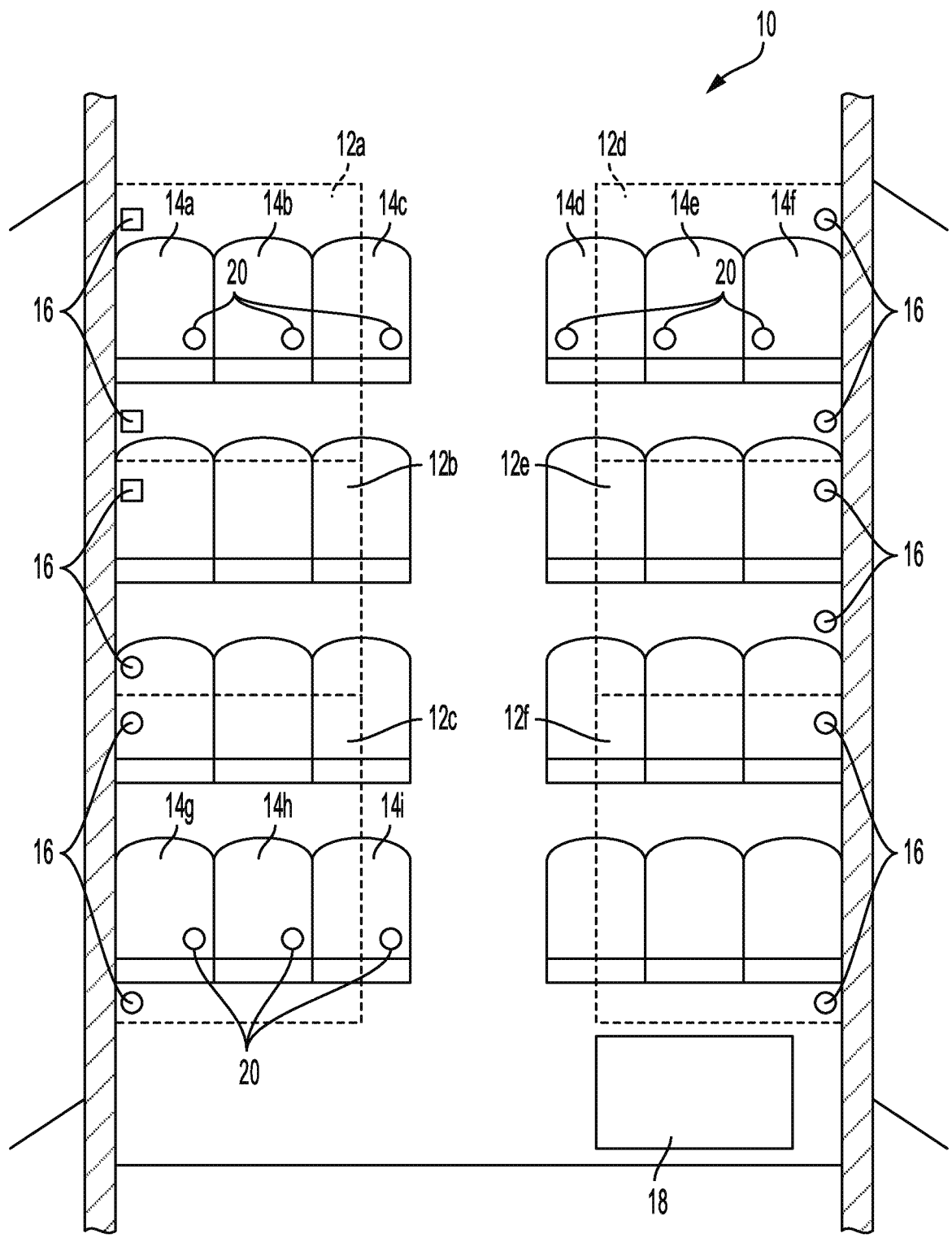

| | | | |
|---|---|---|---|
| 2018/0335413 A1 | 11/2018 | Jouper | |
| 2019/0005441 A1* | 1/2019 | Savian | G06Q 10/087 |
| 2019/0057341 A1* | 2/2019 | Salter | G06Q 10/08 |
| 2019/0212183 A1* | 7/2019 | Zajac | G01G 19/52 |
| 2019/0213698 A1* | 7/2019 | Savian | G06Q 10/02 |
| 2019/0233113 A1* | 8/2019 | Carswell | H04N 7/183 |
| 2019/0325356 A1* | 10/2019 | Savian | G06Q 10/02 |
| 2019/0325538 A1* | 10/2019 | Savian | G07F 9/023 |
| 2020/0193166 A1* | 6/2020 | Russo | G06T 7/194 |

* cited by examiner

PROCESS FOR DETERMINING THAT LUGGAGE HAS BEEN LEFT BEHIND IN AN OVERHEAD BIN

FIELD OF THE INVENTION

This invention relates generally to processes and systems for determining if a piece of luggage has been left behind in an overhead storage bin of a vehicle, and more particularly to processes and systems that send notifications, once it has been determined that luggage has been left behind, to minimize the chance that the passenger completely deboards or exits the vehicle or leaves the gate area without the luggage.

BACKGROUND OF THE INVENTION

Many vehicles utilize overhead bins as storage for passengers on the vehicle. For example, aircraft utilize overhead bins that provide passengers with space for storing luggage and other items.

Occasionally, a passenger may deboard or exit the vehicle without remembering to take the luggage stored in the overhead bin. Once the passenger has exited the vehicle, it may be more difficult for the passenger to return and retrieve the luggage. Moreover, while this is inconvenient for the passenger, it also requires the aircraft operator to exhaust resources in reuniting the passenger and the forgotten luggage item.

In order to reduce the chances that the luggage is left behind, general reminders are often made to the passengers. However, passengers may not hear these general reminders, or may chose to ignore the general reminders. Thus, these general reminders are often ineffective at ensuring that all of the passengers remember to remove their luggage from the overhead bins.

Accordingly, it would be desirable to provide a solution to this problem, and more specifically, to provide specific or individual reminders or notifications to passengers as soon as possible, preferably whilst still on the aircraft, to retrieve the luggage that has been left behind.

SUMMARY OF THE INVENTION

The present invention is directed at providing a solution to this problem by providing processes and systems which utilize sensors to determine if a passenger has left behind luggage in an overhead bin. If luggage has been determined to be left behind, the present processes and systems provide for a notification to be sent reminding the passenger to take the luggage from the overhead bin. In some cases, the notification may be sent directly to the passenger, for example, via a text or other message on a portable electronic device such as cellular phone. In some cases, the notification may be sent to a member of the flight crew to remind a particular passenger that they may have left luggage behind.

The present processes and systems preferably are implemented in an aircraft and most preferably utilize sensors that are already installed on the aircraft. This provides the solution without requiring additional sensors, equipment, and thus weight, to be added to the aircraft.

Specifically, recent designs in overhead aircraft storage bins have included sensors for detecting, for example, empty storage space in overhead bins. Examples of bins with sensors are described in U.S. Pat. Pub. No. 2018/0335413 and U.S. Pat. Pub. No. 2018/0086464. These "smart bins" detect when luggage is stored, the presence of stored luggage, the absence of the luggage, and when luggage is removed. This information is made available to the flight crew and passengers to, for example, provide more efficient luggage storage or to provide notifications of empty space in the bins.

Similarly, recent designs in aircraft seating have provided seats that include sensors configured to detect whether or not a passenger is currently occupying the seat. An example of a seat with sensors is described in WO 2018/185108. This information is utilized to track various statistics and can be used to provide notifications to the flight crew of empty seats.

While the use of the sensors in the seats and the overhead bins provide opportunities for improving flight qualities and efficiencies, the information obtained from these two types of sensors has not been utilized together. Accordingly, in the present processes and systems, the information obtained from the overhead bin sensors may be used in conjunction with the information obtained from the seat sensors to associate luggage stored in an overhead bin with a particular passenger.

Accordingly, in one or more aspects, the present invention may be characterized broadly as providing a process for determining that a luggage has been left behind in an overhead storage bin of a vehicle by: associating a luggage stored in an overhead bin of a vehicle with a passenger of the vehicle, wherein the overhead bin comprises at least one sensor configured to send a signal to a processing unit when the luggage has been stored in the overhead bin; determining that the luggage has been left behind by the passenger after the passenger has left a seat on the vehicle, wherein the seat comprises at least one sensor configured to send a signal to the processing unit indicating that the passenger is seated or not seated in the seat; and, sending a notification to have the passenger retrieve the luggage.

Associating the luggage stored in the overhead bin of the vehicle with the passenger of the vehicle may include: detecting that the passenger has occupied the seat on the vehicle; and, analyzing a database of stored luggage information which includes the luggage; and, assigning the luggage to the passenger. Analyzing the database of stored luggage information may include applying a proximity filter, a time filter, or both to the database of stored luggage.

Determining that the luggage has been left behind by the passenger may include: determining that a row of passengers seated in a row behind the passenger has deboarded the vehicle; and, detecting that the luggage remains in the overhead bin. It is contemplated that determining that the row of passengers seated in a row behind the passenger has deboarded the vehicle includes detecting that luggage associated with passengers in a row behind the passenger has been removed from the overhead bins.

Sending a notification may include: sending an initial notification; detecting whether or not the luggage remains in the overhead bin after the initial notification has been sent; and, when, after a predetermined amount of time has passed after the initial notification has been sent and the remains in the overhead bin, sending a second notification. The initial notification and the second notification may be sent to different devices.

The notification may be sent to a portable device. The portable device may be an airline portable device. The notification may also be sent to an airline ground system.

It is contemplated that after the luggage has been associated with the passenger, the process includes: detecting that the luggage has been moved; and, maintaining the association between the luggage and the passenger.

In a second aspect, the present invention may be generally characterized as providing a system for determining when a passenger has left behind a luggage stored in an overhead bin in a vehicle. The system may include: a processing unit; a plurality of first sensors, each first sensor associated with an overhead bin and configured to send a signal to a processing unit when luggage is stored in the overhead bin; and, a plurality of second sensors, each second sensor associated with a seat and configured to send a signal to the processing unit indicating that a passenger is seated in the seat. The processing unit may be configured to: receive the signals from the plurality of first sensors and the plurality of second sensors; associate a luggage with a passenger of the vehicle; determine that the luggage has been left behind by the passenger; and, send a notification to have the passenger retrieve the luggage.

The luggage may be associated with the passenger of the vehicle by: detecting that the passenger has occupied a seat on the vehicle; analyzing a database of stored luggage information which includes the luggage; and, assigning the luggage to the passenger in the database. The processing unit may be configured to apply a proximity filter, a time filter, or both to the database of stored luggage while analyzing the database of stored luggage information which includes the luggage.

The luggage may be determined to be left behind by the passenger by: determining that a row of passengers seated in a row behind the passenger has deboarded the vehicle; and, detecting that the luggage remains in the overhead bin. The row of passengers seated in a row behind the passenger may be determined to have deboarded the vehicle by detecting that luggage associated with the passengers seated in the row behind the passenger has been removed from the overhead bins.

Sending a notification to have the passenger retrieve the luggage may include: sending an initial notification; detecting whether or not the luggage remains in the overhead bin after the initial notification has been sent; and, when, after a predetermined amount of time has passed after the initial notification has been sent and the luggage remains in the overhead bin, sending a second notification. The processing unit may be further configured to send the initial notification and the second notification to different devices. The initial notification, the second notification, or both may be sent to a passenger portable device.

The processing unit may be further configured to: detect that the luggage has been moved; and, maintain the association between the luggage and the passenger.

These aspects, embodiments, and features, described in more detail below and in the attached drawings and which may be combined in any manner, are believed to provide systems and processes which can determine if luggage has been left behind and provide a notification to the passenger that has left the luggage behind. These and other benefits will be appreciated by those of skill in art in view of the present disclosure.

DETAILED DESCRIPTION OF THE DRAWINGS

Figure 2:
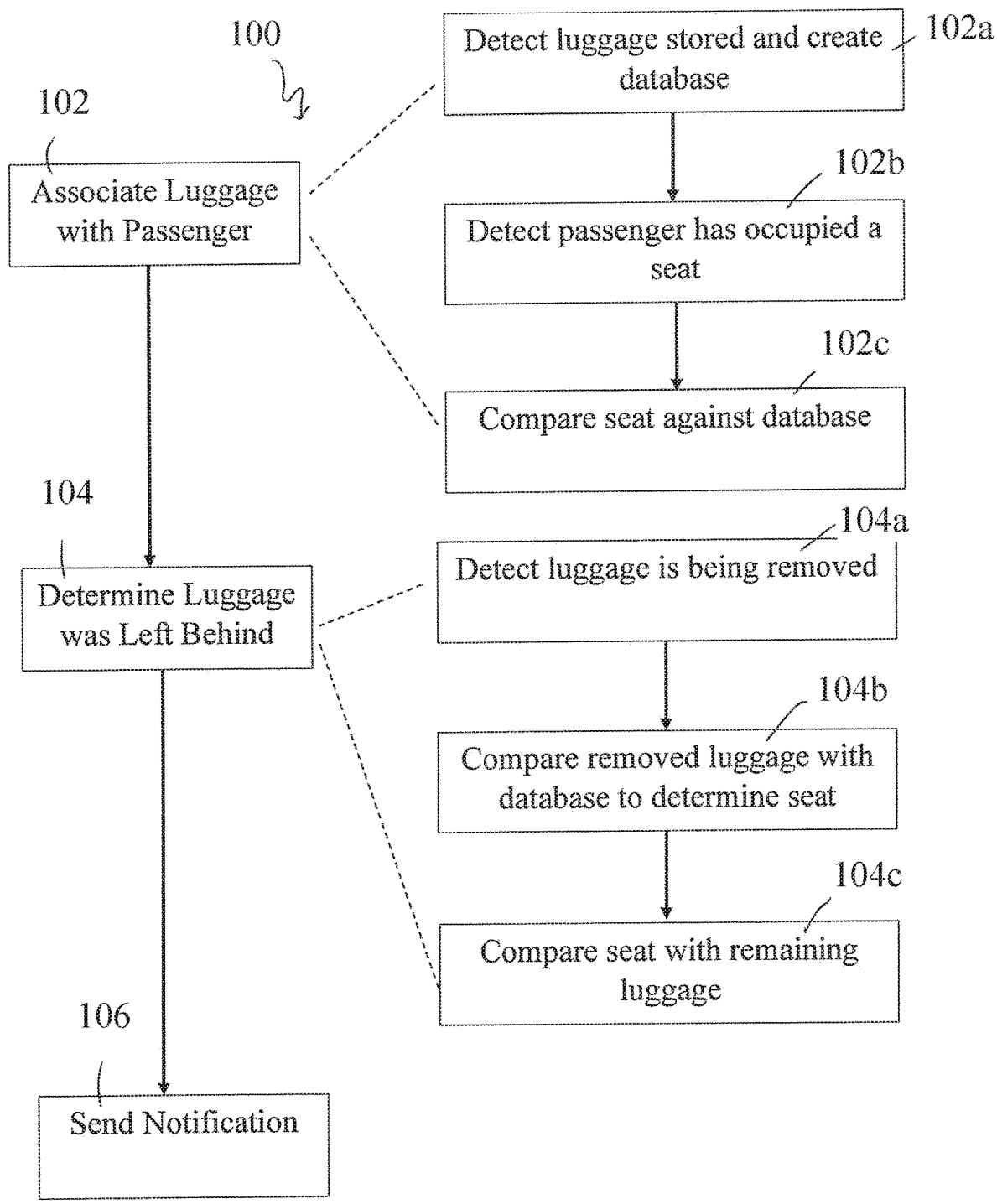

One or more exemplary embodiments of the present invention will be described below in conjunction with the following drawing figure, in which:

FIG. 1 shows a partial, schematic, cutaway top view of an aircraft embodying one or more aspects of the present invention; and FIG. 2 shows a process flow diagram of a process according to various aspects to the present invention.

DETAILED DESCRIPTION OF THE INVENTION

As noted above, the present invention is directed at detecting forgotten hand luggage items in overhead storage compartments and alerting the specific passenger shortly afterwards and/or the crew personal—for example at the door area of the cabin before the passenger leaves the vehicle. Even if the notification does not result in the passenger retrieving the luggage, the association between the luggage and the passenger made by the present systems and processes may still be utilized to ultimately return the luggage to the passenger.

In order to assign or associate luggage with particular passengers on the vehicle to particular passengers, the present systems and processes receive and monitor sensor information. This passenger-luggage association may be done by comparing a seat occupancy sensor with a luggage placed shortly beforehand nearby. The luggage position is derived from sensors in the overhead storage compartment. As noted above, when the vehicle is an aircraft, these sensors may already be present and thus no new equipment is required. The present systems and processes may utilize existing vehicle servers (for example on an aircraft in the open software platform of the air line network architecture (ALNA) connectivity system.

During most deboarding phases, passengers leave the aircraft from front to rear (or remain seated). Accordingly, luggage is typically removed, row by row, from the front to the rear of the aircraft. If a seat is not occupied anymore and passengers seated behind that seat/row have already removed their luggage, the present systems and processes determines that the luggage of that passenger has been left behind. Also, if a crew member moves a luggage from one compartment to the next before the passenger deboards, the present systems and processes may track the movement so that the association with the passenger is not lost.

With these above general aspects of the present invention in mind, one or more embodiments of the present invention will be described with the understanding that the following description is not intended to limit the present disclosure.

The present systems and processes will be described herein as relating to, as shown in FIG. 1, an aircraft 10 having overhead storage bins 12a, 12b, 12c, 12d, 12e, 12f and seats 14a, 14b, 14c, 14d, 14e, 14f, 14g, 14h, 14i; however, it should be appreciated that the processes and systems could be used with other vehicles which utilize overhead storage bins 12a, 12b . . . 12f, such as, for example, buses and trains. For clarity purposes, in the drawings, only certain seats 14a, 14b, . . . 14i and overhead storage bins 12a, 12b, . . . 12f have been labeled. Additionally, while the present disclosure refers to "luggage," it should be understood and appreciated that this term refers to anything that is stored in the overhead storage bins 12a, 12b . . . 12f, like a box, bag, jacket, suitcase, backpack, garment bag, or the like.

The overhead storage bins 12a, 12b . . . 12f each comprise one or more sensors 16 that are in communication with a processing unit 18. For clarity purposes wires connecting the sensors 60 and the processing unit 18 are not shown. Additionally, the sensors 60 may utilize wireless connectivity.

The processing unit 18 may be any suitable device configured to cause a series of steps to be performed so as to implement the method such that instructions, when executed by a computing device or other programmable apparatus, may cause the functions/acts/steps specified in the methods described herein to be executed. The processing unit 18 may be, for example, any type of general-purpose processor, microprocessor, controller, microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The processing unit 18 may include memory that is any suitable known or other machine-readable storage medium. The memory may be a non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the processing unit 18 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may include any storage means (e.g., devices) suitable for retrievably storing the computer-executable instructions executable by the processing unit 18.

The methods and systems described herein may be implemented in a high-level procedural or object-oriented programming or scripting language, or a combination thereof, to communicate with or assist in the operation of the processing unit 18. Alternatively, the methods and systems described herein may be implemented in assembly or machine language. The language may be a compiled or interpreted language. Program code for implementing the methods and systems for described herein may be stored on the storage media or the device, for example a ROM, a magnetic disk, an optical disc, a flash drive, or any other suitable storage media or device. The program code may be readable by the processing unit 18 to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Returning to FIG. 1, the sensors 16 provides a signal to the processing unit 18 relating to the presence or absence of a luggage item in the overhead storage bins 12a, 12b . . . 12f. The sensors 16 may be laser sensors, infrared sensors, ultra-sound sensors, or pressure sensors.

The sensors 16 may simply provide signals to the processing unit 18 where the processing unit 18 utilizes the signals to detect certain conditions and make determinations. Alternatively, the sensors 16 may include a processor and a program module in memory which includes instructions for the sensors 16 to determine certain conditions and make determinations. In other words, either the sensor 16 or the processing unit 18 can detect or determine the presence or absence of luggage in the overhead storage bins 12a, 12b . . . 12f.

The seats 14a, 14b, . . . 14i each also comprise one or more sensors 20 that are again in wireless or wired communication with the processing unit 18. Although depicted as a single processing unit 18, it is contemplated that multiple processing units 18 are present, and the various processing units 18 are in communication with each other.

The sensors 20 in the seats 14a, 14b, . . . 14i provide a signal to the processing unit 18 relating to whether or not a passenger is sitting in a seat 14a, 14b, . . . 14i. The sensors 20 may be pressure sensors.

As with the sensors 16 in the overhead storage bins 12a, 12b, . . . 12f, the sensors 20 in the seats 14a, 14b, . . . 14i may include a processor and a program module in memory which includes instructions allowing the sensors 20 to detect certain conditions and make determinations. In other words, either the sensor 20 or the processing unit 18 can detect or determine whether or not a passenger is sitting in a particular seat 14a, 14b, . . . 14i.

An exemplary process 100 according to the present invention is shown in FIG. 2 and will be discussed below.

In a first step 102 of the process, a piece of luggage is associated with a particular passenger. This may be accomplished with data from both sets of sensors 16, 20.

For example, in sub-step 102a, when a piece of luggage is stored in one of the overhead storage bins 12a, 12b, . . . 12f, one of the sensors 16 in that overhead bins 12a, 12b, . . . 12f provides a signal to the processing unit 18. The processing unit 18 notes the time of the luggage being stored and creates a database. The database may be in memory of the processing unit 18 or it may be in a server in communication with the processing unit 18.

The database includes information about each luggage detected in the overhead storage bins 12a, 12b, . . . 12f, including the time each luggage was stored in the overhead storage bin 12a, 12b, . . . 12f, as well as a location of the luggage in a particular overhead storage bin 12a, 12b, . . . 12f. This location information may come from a database or may be based on a signal or portion of signal from the sensor 16 that provides signals relating to the luggage.

As passengers occupy each of the seats 14a, 14b, . . . 14i in the aircraft 10, the sensor(s) 20 in the individual seats 14a, 14b, . . . 14i provide signals, in sub-step 102b, to the processing unit 18 indicating that a passenger has occupied a particular seat 14a, 14b, . . . 14i. Once a passenger has been seated in a particular seat 14a, 14b, . . . 14i, the processing unit 18 compares, in sub-step 102c, the location of the seat 14a, 14b, . . . 14i with the database of stored luggage information to locate the luggage that belongs to that passenger.

The processing unit 18 may utilize a time filter of, for example, 15 seconds, 30 seconds, 1 minute, 2 minutes, or any other reasonable time, between the passengers occupying a seat and a piece of luggage being stored. In other words, the processing unit 18 only compares luggage that has been stored within some limited time prior to receiving the signal for seats 14a, 14b, . . . 14i (e.g., 2 minutes).

Similarly, the processing unit 18 may utilize a location or proximity filter of, for example, 5 rows, 4 rows, 3 rows, or any other distance between the overhead storage bin 12a, 12b, . . . 12f and the seat 14a, 14b, . . . 14i. In other words, the processing unit 18 only compares signals for seats 14a, 14b, . . . 14i that are occupied against luggage from overhead storage bin 12a, 12b, . . . 12f that are within a specific row limit (e.g., within 5 rows in either direction). Similarly, the proximity filter may utilize location information based on the side of the aisle the seats 14a, 14b, . . . 14i and the overhead storage bin 12a, 12b, . . . 12f are located so that only information from luggage on the same side of the aisle as the seat 14a, 14b, . . . 14i is considered.

The processing unit 18 may also filter the database by excluding luggage and seats 14a, 14b, . . . 14i that have already been assigned. This filter is particularly applicable as passengers in seats 14a, 14b, . . . 14i stand to allow new passengers to sit in other seats 14a, 14b, . . . 14i.

The step 102, or sub-steps 102a-102c, of the process 100 proceeds iteratively as more passengers store luggage in the overhead storage bin 12a, 12b, . . . 12f and occupy seats 14a, 14b, . . . 14i to determine which piece of luggage stored in the overhead storage bin 12a, 12b, . . . 12f belongs to which a passenger in a particular seat 14a, 14b, . . . 14i.

It is contemplated that the process 100 may initially associate a piece of luggage with a passenger in one or more seats 14a, 14b, . . . 14i. In other words, a piece of luggage may initially be associated with a subset of passengers in particular seats 14a, 14b, . . . 14i, which include, for example, fewer than 10 passengers. As the process proceeds iteratively, passengers may be eliminated from the subset based on the passenger being associated with a different piece of luggage as more information is received from the sensors 16, 20.

The association of the luggage in the overhead storage bin 12a, 12b, . . . 12f with a particular passenger(s) of a particular seat 14a, 14b, . . . 14i is stored in the database. If the pieces of luggage are moved once they have been associated, for example, if a piece of luggage is moved by a flight crew member to make more space, the database is updated to reflect the new location of the piece of luggage but the association with a passenger in a particular seat 14a, 14b, . . . 14i is maintained.

In a second step 104 of the process 100, a piece of luggage is determined to be left behind. To accomplish this, the processing unit 18, in sub-step 104a, receives signals indicating that luggage has been removed from the overhead storage bin 12a, 12b, . . . 12f.

The processing unit 18, in sub-step 104b, compares the luggage that has been removed against the database to identify the seat 14a, 14b, . . . 14i of the passenger that removed the luggage, and more particular, the row that the passenger was seated in.

The processing unit 18 then, in sub-step 104c, compares that information for the removed luggage against remaining luggage to determine if passengers from one or more rows in front of the identified row of the remaining luggage have left. If so, the luggage is determined to be left behind luggage.

In the second step, the processing unit 18 may apply another filter, for example, waiting for passengers in two or three rows away to remove luggage before determining that luggage is left behind. The processing unit 18 may also take into account information concerning whether the passengers in various seats 14a, 14b, . . . 14i have left their seats 14a, 14b, . . . 14i; however, since many passengers tend to stand up once the aircraft has reached the gate, such information is only used as a secondary consideration in this determination, as opposed to the information of the luggage being removed, as a primary, or main, consideration.

Additionally, the processing unit 18 may also compare current information from the sensor 20 in the seat 14a, 14b, . . . 14i for the passenger associated with the left behind luggage as a confirmation. It is further contemplated that the processing unit 18 consider information from other sensors in the aircraft 10, such as sensors that count passengers in the aircraft 10.

Once luggage has been determined as being left behind, the process proceeds to a third step 106 in which the processing unit 18, via a communication module, sends a notification or causes a notification to be sent. In some embodiments, the notification may be sent to, for example, a flight crew member. This notification may be sent to a handheld or portable device, like a smart phone, tablet, or computer, utilized by the flight crew member, or to a display screen in the aircraft 10, or both.

Additionally or alternatively, the notification may be sent to the passenger via a portable device like a smart phone, tablet, or computer, by, for example, by comparing the passenger associated with the luggage against a flight manifest and determining a contact information that could be an email, a cell phone number, or an airline application. The notification could be, a text message, an email, an automated telephone call, or a notification through the airline application.

Additionally or alternatively, the notification may be sent, via an airline ground system, to a member of the airport ground or gate crew, altering them to stop or detain the passenger while the luggage is removed from the plane and brought to them at the gate. The gate personnel may issue a reminder to a subset of passengers is the association is not made with a particular passenger. For example, a reminder could be made to the people sitting in row 31 as they exit the gate. Additionally, the airline ground system (i.e., a server or computer) may have access to passenger list and contact information and may be in communication or able to be in communication with portable devices of the flight crew members, the ground crew, and the passengers.

Additionally, it is contemplated that the notification is sent first to the flight crew, and then to the passenger, and then to the gate crew. Other orders of sending the notification may be utilized.

If the notification(s) is unsuccessful at reuniting the passenger and left behind luggage, the processing unit may provide the information from the database to the airline which could use various methods to return the luggage to the passenger.

For example, with reference to FIG. 1, as passengers being to load luggage into the overhead storage bins 12a, 12b, . . . 12f, the sensors 16 in each overhead storage bin 12a, 12b, . . . 12f provide signals to the processing unit 18. The processing unit 18 creates a database of stored luggage information that may include the time and the location of each stored luggage item.

When a passenger sits in seat 14h, the sensor 20 in seat 14h provides a signal to the processing unit 18. The processing unit 18 compares seat 14h against the database of stored luggage information to determine which, if any, stored luggage item belongs to the passenger in seat 14h. The processing unit 18 may exclude luggage that is already associated or assigned to a passenger. Additionally, the processing unit 18 may exclude luggage that is too far away and luggage that was stored too long ago. As the process proceeds iteratively, the luggage will be associated with passengers.

When the passengers start deboarding, each overhead storage bin 12a, 12b, . . . 12f provide signals to the processing unit 18 indicating that passengers are leaving. Thus, when the passenger in seat 14h removes the luggage associated to that passenger, the processing unit 18 compares that against the database of stored luggage information to locate luggage associated with passengers in previous rows.

For example, if the database of stored luggage information indicates that luggage associated with a passenger in seat 14*b* is still in the overhead storage bin 12*a*, 12*b*, . . . 12*f*, the processing unit 18 could verify if the passenger has deboarded by confirming the signals associated with the sensor 20 in seat 14*b*. If the signal indicates that the seat is unoccupied, the luggage associated with the passenger in seat 14*b* is determined to be left behind.

The processing unit 18 may then send a notification to the flight crew at the exit and indicating that passenger in seat 14*b* left behind luggage. The processing unit 18 may send a notification to the passenger's smart phone if the appropriate contact information is available or accessible. Even if the passenger completely leaves the aircraft 10 or the airport, the association of the passenger with the luggage may be used to reunite the passenger and the luggage.

These systems and processes utilize the existing sensors and equipment on the aircraft to determine that a piece of luggage has been left behind and provide ways to minimize the chance that the passenger leaves the plane, gate, or airport without the passenger's luggage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A process for determining that a luggage has been left behind in an overhead storage bin of a vehicle, the process comprising:
    detecting that a luggage has been stored in an overhead bin of a vehicle by sending a signal from at least one sensor to a processing unit when the luggage has been stored in the overhead bin and creating a database of stored luggage information based on the signal from the at least one sensor;
    associating the luggage with a passenger of the vehicle;
    determining that the luggage has been left behind by the passenger after the passenger has left a seat on the vehicle, wherein the seat comprises at least one pressure sensor configured to send a signal to the processing unit indicating that the passenger is seated or not seated in the seat; and,
    sending a notification to have the passenger retrieve the luggage,
    wherein associating the luggage stored in the overhead bin of the vehicle with the passenger of the vehicle comprises:
        detecting that the passenger has occupied the seat on the vehicle with the at least one pressure sensor;
        analyzing the database of stored luggage information which includes the luggage;
        applying a proximity filter, a time filter, or both to the database of stored luggage information to associate the luggage stored in the overhead bin of the vehicle with the passenger of the vehicle; and
        assigning the luggage to the passenger,
    wherein the proximity filter comprises comparing only luggage that has been stored within a predetermined number of rows of the seat occupied by the passenger, and
    wherein the time filter comprises comparing only luggage that has been stored within a predetermined time before the passenger occupied the seat.

2. The process of claim 1, wherein analyzing the database of stored luggage information comprises:
    applying a proximity filter, a time filter, or both to the database of stored luggage to reduce a number of stored luggage entries in the database of stored luggage information.

3. The process of claim 1, wherein determining that the luggage has been left behind by the passenger comprises:
    determining that a row of passengers seated in a row behind the passenger has deboarded the vehicle; and,
    detecting that the luggage remains in the overhead bin.

4. The process of claim 3, wherein determining that the row of passengers seated in a row behind the passenger has deboarded the vehicle comprises:
    detecting that luggage associated with passengers in a row behind the passenger has been removed from the overhead bins.

5. The process of claim 1 wherein sending a notification comprises:
    sending an initial notification;
    detecting whether or not the luggage remains in the overhead bin after the initial notification has been sent; and,
    when, after a predetermined amount of time has passed after the initial notification has been sent and the remains in the overhead bin, sending a second notification.

6. The process of claim 5, wherein the initial notification and the second notification are sent to different devices.

7. The process of claim 5, wherein the notification is sent to a portable device.

8. The process of claim 5, wherein the portable device is an airline portable device.

9. The process of claim 5, wherein the notification is sent to an airline ground system.

10. The process of claim 1, wherein after the luggage has been associated with the passenger, the process comprising:
    detecting that the luggage has been moved; and,
    maintaining the association between the luggage and the passenger.

11. A system for determining when a passenger has left behind a luggage stored in an overhead bin in a vehicle, the system comprising:
    a processing unit;
    a plurality of first sensors, each first sensor associated with an overhead bin and configured to send a signal to a processing unit when luggage is stored in the overhead bin; and,
    a plurality of second sensors, each second sensor comprising a pressure sensor associated with a seat and configured to send a signal to the processing unit indicating that a passenger is seated in the seat; and,
    wherein the processing unit is configured to:
        receive the signals from the plurality of first sensors and create a database of stored luggage information based on the signals from the plurality of first sensors;

receive the signals from the plurality of second sensors;
associate a luggage with a passenger of the vehicle by determining that the passenger has occupied a seat on the vehicle, analyzing the database of stored luggage information which includes the luggage, apply a proximity filter, a time filter, or both to the database of stored luggage information to associate the luggage stored in the overhead bin of the vehicle with the passenger of the vehicle, and, assigning the luggage to the passenger in the database;
determine that the luggage has been left behind by the passenger; and,
send a notification to have the passenger retrieve the luggage,
wherein the proximity filter comprises comparing luggage that has been stored within a predetermined number of rows of the seat occupied by the passenger, and
wherein the time filter comprises comparing luggage that has been stored within a predetermined time before the passenger occupied the seat.

12. The system of claim 11, wherein the luggage is determined to be left behind by the passenger by:
determining that a row of passengers seated in a row behind the passenger has deboarded the vehicle; and,
detecting that the luggage remains in the overhead bin.

13. The system of claim 12, wherein the row of passengers seated in a row behind the passenger is determined to have deboarded the vehicle by:
detecting that luggage associated with the passengers seated in the row behind the passenger has been removed from the overhead bins.

14. The system of claim 11, wherein sending a notification to have the passenger retrieve the luggage comprises:
sending an initial notification;
detecting whether or not the luggage remains in the overhead bin after the initial notification has been sent; and,
when, after a predetermined amount of time has passed after the initial notification has been sent and the luggage remains in the overhead bin, sending a second notification.

15. The system of claim 14, wherein the processing unit is configured to send the initial notification and the second notification to different devices.

16. The system of claim 14, wherein the initial notification, the second notification, or both are sent to a passenger portable device.

17. The system of claim 11, wherein the processing unit is further configured to:
detect that the luggage has been moved; and,
maintain the association between the luggage and the passenger.

18. The system of claim 11, wherein the first sensors from the plurality of first sensors are each, independently, selected from a group consisting of: a laser sensor, an infrared sensor, an ultra-sound sensor, or a pressure sensor.

* * * * *